United States Patent [19]

Grimes, deceased

[11] 4,221,588

[45] Sep. 9, 1980

[54] OXIDATION ROASTING OF ORE

[75] Inventor: George R. Grimes, deceased, late of Burgettstown, Pa., by Mary E. Grimes, executrix

[73] Assignee: AMAX Inc., Greenwich, Conn.

[21] Appl. No.: 538,181

[22] Filed: Jan. 2, 1975

Related U.S. Application Data

[63] Continuation of Ser. No. 859,726, Sep. 22, 1969, abandoned.

[51] Int. Cl.$^2$ .......................... C22B 1/02; C22B 1/10
[52] U.S. Cl. ................................. 75/7; 75/9
[58] Field of Search ........................... 75/7–9; 423/542, 153

[56] References Cited

U.S. PATENT DOCUMENTS

| | | | |
|---|---|---|---|
| 1,912,621 | 6/1933 | Clark | 75/9 |
| 2,847,294 | 8/1958 | Long et al. | |
| 3,047,365 | 7/1962 | Jukkola | |
| 3,632,312 | 1/1972 | Jukkola | 423/542 |

FOREIGN PATENT DOCUMENTS 217258  5/1956  Australia.

OTHER PUBLICATIONS

Engr. and Mining Journal, vol 151, No. 3, Mar. 1950, "FluoSolids for Roasting", by Counselman, pp. 84 and 85.

*Primary Examiner*—P. D. Rosenberg
*Attorney, Agent, or Firm*—Kasper T. Serijan; Michael A. Ciomek; Eugene J. Kalil

[57] ABSTRACT

The roasting temperature of ore, such as sulfide concentrate, is controlled by feeding water and air under pressure to at least one spray nozzle located relative to a roasting zone containing the ore, means being employed for selectively varying the ratio of water and air fed to the nozzle in accordance with the temperature to be desired and maintained in the roasting zone.

8 Claims, 16 Drawing Figures

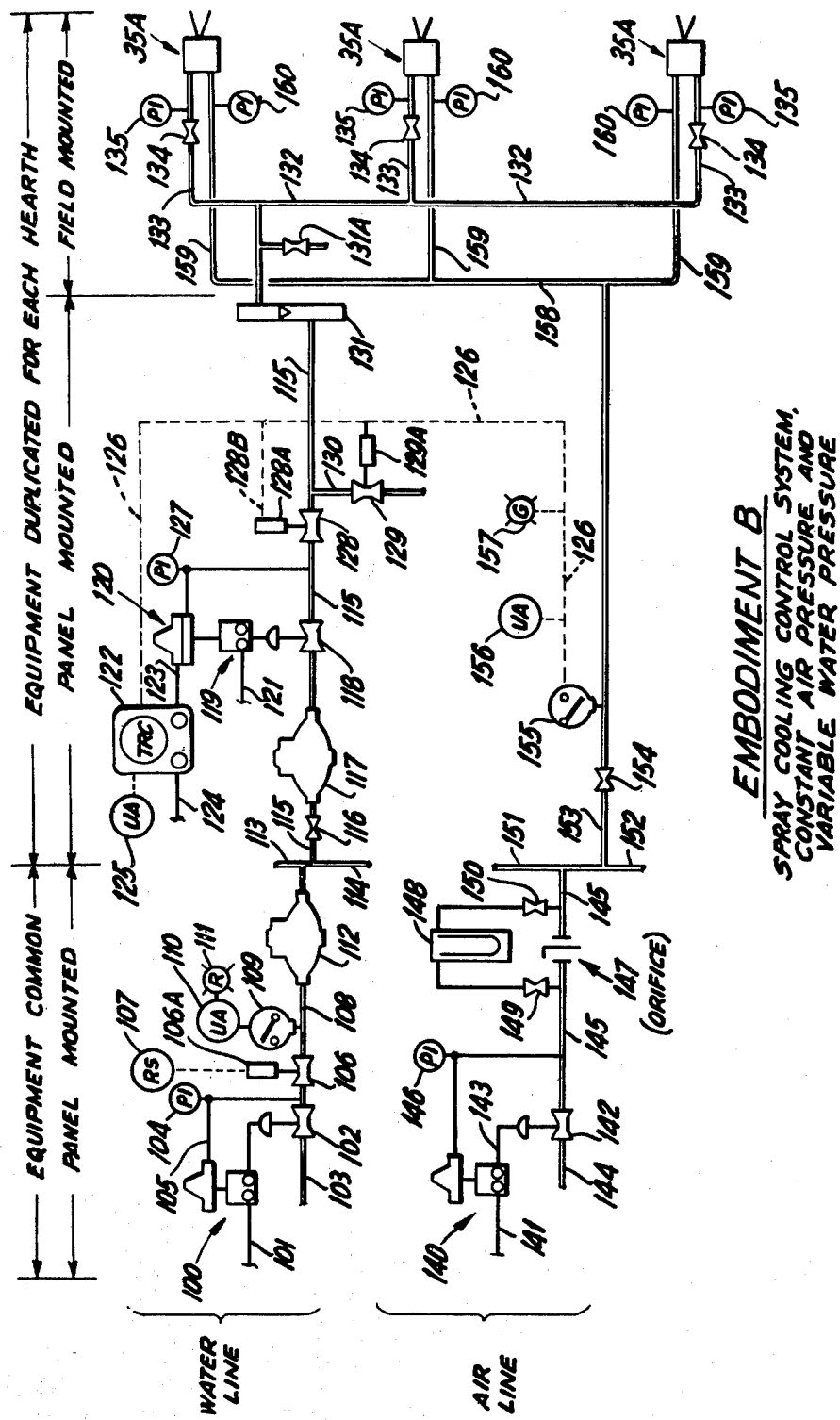

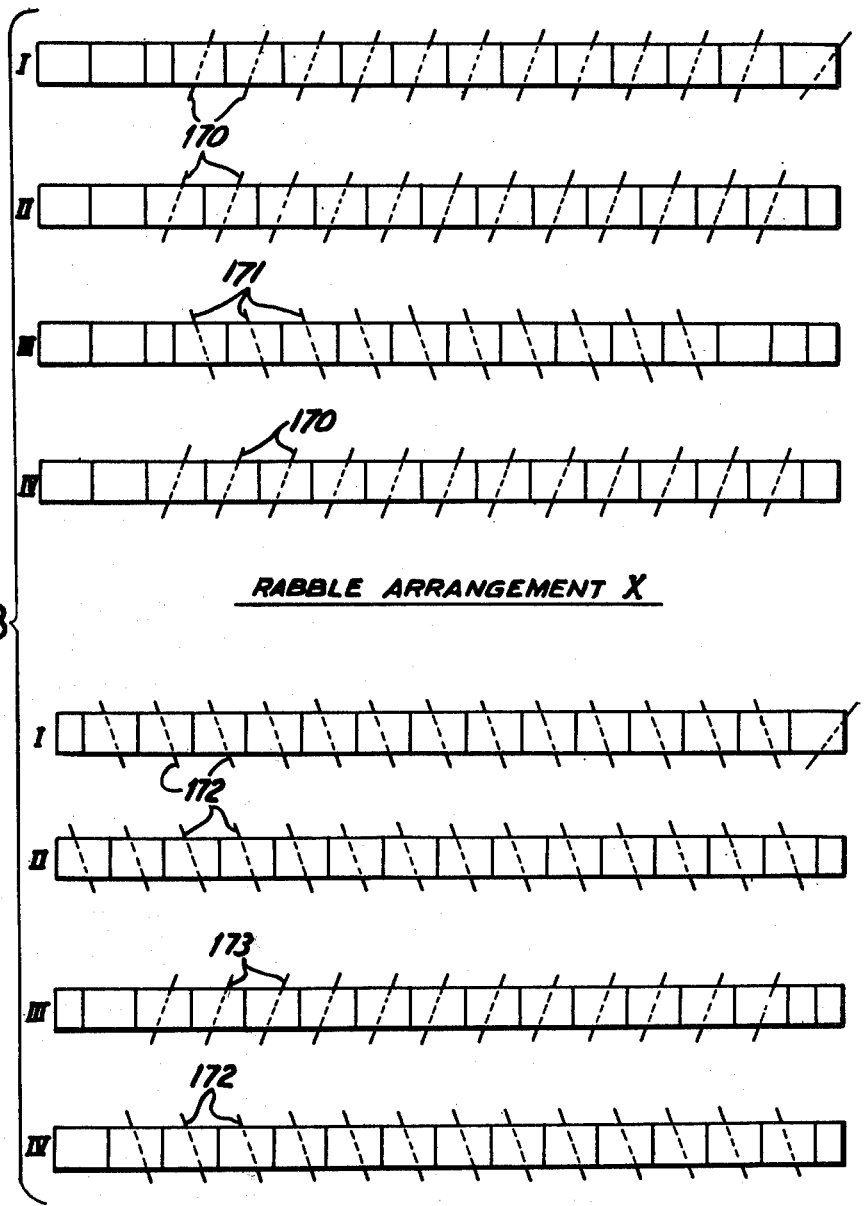

OXIDATION ROASTING OF ORE

This is a continuation of copending application Ser. No. 859,726, filed Sept. 22, 1969, abandoned.

This invention relates to a method and apparatus for controlling the roasting temperature of ore, such as sulfur-containing ore, and, in particular, the roasting temperature of molybdenum sulfide concentrate, e.g. molybdenite.

FIELD OF THE INVENTION

It is well known to convert molybdenite to molybdenum oxides by roasting using multiple hearth furnaces of the type variously referred to as Herreshoff, Nichols, Nichols-Herreshoff, Wedge, Skinner and other types of roasting furnaces. Conversion of molybdenite concentrates to molybdenum oxides involves the evolution of large amounts of heat. This heat must be dissipated in such a way so as to avoid prolonged retention at elevated temperatures at which molybdic oxide, or other molybdenum oxide, vaporizes, melts or fuses with other constituents.

Where production rates are very low, the heat evolved by conversion of molybdenite can generally be dissipated through the furnace walls. Under these conditions, the effluent gas will tend to contain optimum amounts of $SO_2$, for example, about 4 to 6% $SO_2$, which is advantageously recoverable as sulfuric acid. However, overall economics militate against low production rates, the trend being towards using as high a production rate as possible.

For the past several years, heat dissipation has been accomplished by using large excesses of air during the roasting operation, whereby the amount of air in excess of that required to promote oxidation is employed to modulate the temperature. This concept of temperature control is described in a paper entitled "Climax Conversion Practice" by E. S. Wheeler, AIME Technical Publication 1718, published in Metals Technology of August, 1944, in Volume 159.

With this system of roasting, the temperature is controlled by increasing or decreasing the draft on the furnace to increase or decrease the quantity of air into the furnace. As the flow of air into the furnace increases, the temperature in the furnace decreases. Control, however, is general rather than selective, for an increase or decrease in furnace draft increases or decreases the air flow at all locations, and not at selected locations.

Subsequently, the system was modified to hold the draft on the furnace constant. Air flow into the multiple hearth furnace was changed by increasing or decreasing the size of the openings into the furnace. Selection of openings to be increased or decreased provided a measure of localized control.

While the modified system was an improvement over earlier efforts and represented the best available, it had many objectionable features.

For example, the temperature of the top hearths could not always be controlled by use of excess air. In particular, increasing the air flow to the two top hearths resulted in increased combustion and higher temperatures. It was therefore necessary to limit the amount of reaction on the top hearths by restricting air flow to these hearths.

Air flow on lower hearths was not truly across the hearth as planned but tended to flow upward as well as across. Consequently, only a small section of lower hearths could be effectively cooled by air through a single opening and admission of air to lower hearths tended to affect hearths immediately above. The pattern of air flow was complex and uniform temperature across a single hearth was seldom attained.

Moreover, the use of excess air as a means for attaining higher production rates resulted in diluting the flue gas to such an extent that it customarily contained only 1 to 1.5% sulfur dioxide. Such flue gases did not lend themselves to recovery, as established systems require more than 1.5% sulfur dioxide for economic recovery. Under such conditions, the sulfur dioxide was generally wasted to the atmosphere, thus losing potential sulfur values and contributing to air pollution.

In some locations, the use of tall chimneys has been effective in controlling ground level concentrations of sulfur dioxide below generally recognized harmful limits. However, there is growing concern that this solution will not be acceptable at all locations where it may be desirable to operate a molybdenum conversion facility. Recent government legislation has placed a limit as to the quantity of sulfur dioxide which may be safely emitted at any given location.

I have now discovered an improved method and apparatus whereby the temperature of roasting can be easily controlled without diluting the effluent gas and without requiring the use of high rates of air flow. The improved method results in a richer effluent gas, an increase in throughput, an increase in heat capacity with less volume of gas throughput, a decrease in dust load and other additional improvements as will be apparent from the disclosure which follows.

OBJECTS OF THE INVENTION

It is thus an object of the invention to provide an improved method and apparatus for continuously controlling the temperature of exothermic reactions for example, in the roasting of sulfur-containing ore.

Another object is to provide a method and means for roasting molybdenite concentrates.

A still further object is to provide an improved ore-roasting process characterized by improved roasting efficiency and, additionally, by increased throughput.

A further object is to provide a control system for automatically regulating the temperature of molybdenite conversion furnaces.

The invention also provides as an object a control system for improving the roasting of sulfide concentrates, while improving the concentration of sulfur dioxide in the flue gas consistent with optimum recovery of sulfur dioxide and reduced cost of air pollution.

As an additional object, the invention also provides an improved roasting process in which the volume of flue gas is reduced, thus permitting a reduction in size of the gas handling and dust collection systems.

These and other objects will more clearly appear when taken in conjunction with the following disclosure and the accompanying drawing, wherein:

FIGS. 7, 7A, 7B, 8 and 8A show diagrammatically various embodiments which may be employed in carrying out the method and apparatus aspects of the invention;

FIG. 13 depicts diagrammatically one embodiment of rabbling arms which may be employed in mixing the material, e.g. sulfide concentrate, during roasting on various hearth levels.

GENERAL DISCLOSURE OF THE INVENTION

Stating it broadly, the method aspect of the invention resides in a process for controlling the oxidation roasting of metalliferous materials, e.g. ores, such as sulfide concentrates, which comprises, feeding water and air under pressure to at least one spray nozzle located relative to a roasting zone, and selectively varying the ratio of water and air fed to the nozzle in accordance with the temperature to be desired and maintained in the zone. (Note FIG. 7A)

The apparatus employed in carrying out the invention, comprises a furnace having at least one roasting zone or hearth, a first means for feeding water and air to at least one spray nozzle located relative to the roasting zone, a second means for varying the ratio of water and air fed to the nozzle and control means responsive to the change in temperature in the roasting nozzle for controlling the second means in accordance with the temperature to be maintained in the roasting zone. (Note FIG. 7A)

The water and air are delivered under pressure to the spray nozzle, the water flow at a given pressure being related to the air pressure. A temperature controller is employed to sense the temperature of the furnace hearth and, when the temperature varies, the controller provides an impulse for modulating air or water pressure to the nozzle via a corresponding pressure regulator. Thus, in one embodiment (note FIG. 7B), the water pressure may be held constant and the water flow varied by changing the air pressure. In an alternative embodiment (note FIG. 8A), air is delivered to the spray nozzle at constant pressure and volume, while the water is delivered at varying pressures depending upon the temperature being sensed in the roasting zone by the temperature controller.

Figure 1:
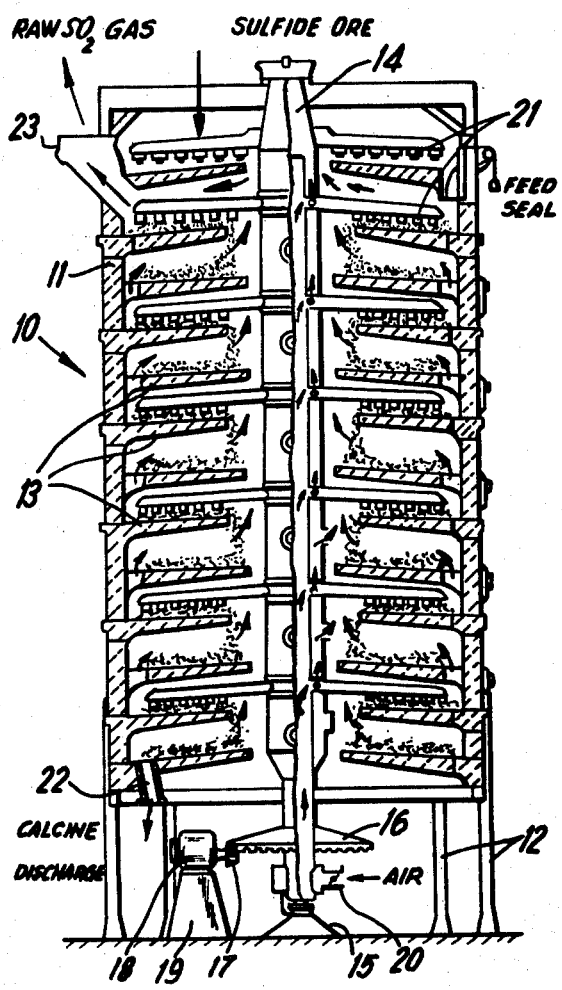
FIG. 1 is illustrative of one embodiment of a multi-hearth roasting furnace of the Nichols-Herreshoff type.

The control system may be applied to the conventional multi-hearth type Nichols-Herreshoff furnace shown in FIG. 1. The furnace 10 illustrated is comprised of an outer shell 11 of suitable heat resistant material supported on legs 12, the furnace having a plurality of multi-level hearths 13, each having a centrally located axial opening through which a hollow shaft 14 passes and is rotatably supported by a base 15. The hollow shaft is provided with a bevelled gear 16 which is driven by drive gear 17 mounted on motor 18 which is supported on pillow block 19. The hollow shaft is provided with an air feed opening 20 through which air is fed, the hollow shaft having air exit openings at each hearth level through which the air flows into the rabble arms at each hearth level while circulating from the bottom to the top of the furnace. Gas is fed by means not shown, the gas conventionally circulating as shown by the arrows. However, certain of the hearths may have outlet flues to promote cross flow (note FIG. 5). The air flow serves a two-fold purpose: it helps to keep the furnace from overheating; and, secondly, it provides the necessary oxidizing atmosphere for roasting the ore. Each hearth has associated with it rabble arms 21 which project radially outward from the shaft. Thus, as the shaft rotates, the sulfide concentrate is fed from the top of the furnace and falls from hearth to hearth as the concentrate is being rabbled. The rabbling is such that, on one hearth, it is rabbled outwardly and deposits on the next hearth below, the rabble arms on the next hearth being adapted to move the concentrate radially inwardly until it deposits on the next succeeding hearth below it, and so on. As the concentrate courses its way downward, it is converted to an oxide and is discharged as calcine at the bottom at 22. As the $SO_2$ forms, it leaves with the flue gas at the top at 23.

Figure 2:
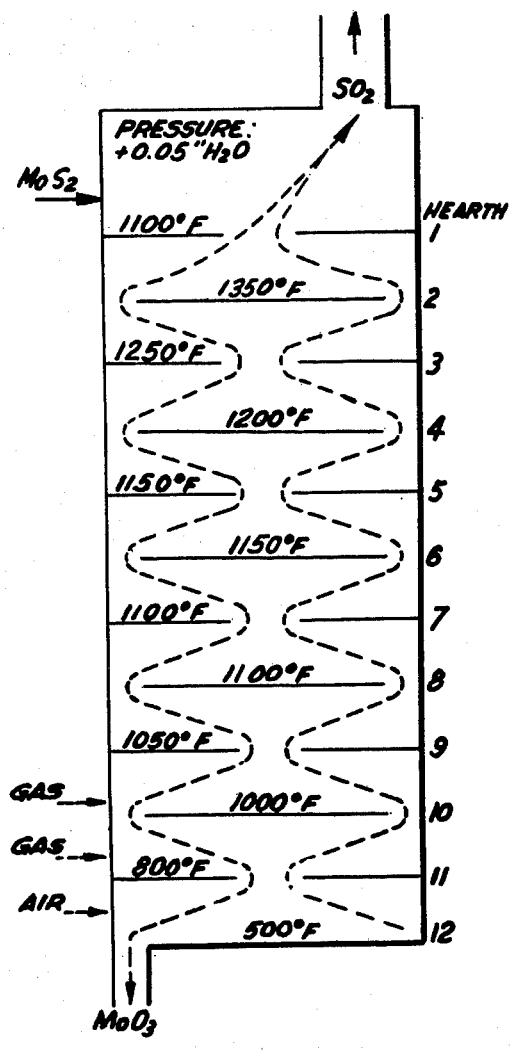
FIG. 2 shows diagrammatically the steady state condition which may exist in a multi-hearth furnace.

Generally speaking, under ordinary roasting conditions, the temperature profile may reach a steady state along the line shown diagrammatically in FIG. 2. As will be noted, the temperature appears to be highest at hearths No. 2 to No. 4, the temperature falling within the range of about 1200° F. to 1350° F. The temperature on these hearths is frequently above the control temperature, while the temperature at the lower hearths is generally controlled under conventional practice. It would be desirable to maintain the temperature at the top three or four hearths over a lower range, such as 1100° F. or 1200° F., in order to avoid melting or fusing with other ingredients. The inventive concept of spray cooling enables this to be done easily, effectively and efficiently.

DETAILS OF THE INVENTION

Various embodiments of the system and method may be employed in carrying the invention into practice. As stated hereinbefore, spray cooling is achieved by controllably feeding water and air under pressure to spray nozzles located at one or more hearth levels of the furnace.

In one embodiment, e.g. Embodiment A, the ratio of calibrated air and water flow fed under pressure through each nozzle may be varied with air pressure, the water pressure being maintained relatively constant. In another embodiment, e.g. Embodiment B, the ratio of calibrated air and water flow fed under pressure through each nozzle may be varied with water pressure, the air pressure being maintained relatively constant.

Figure 3:
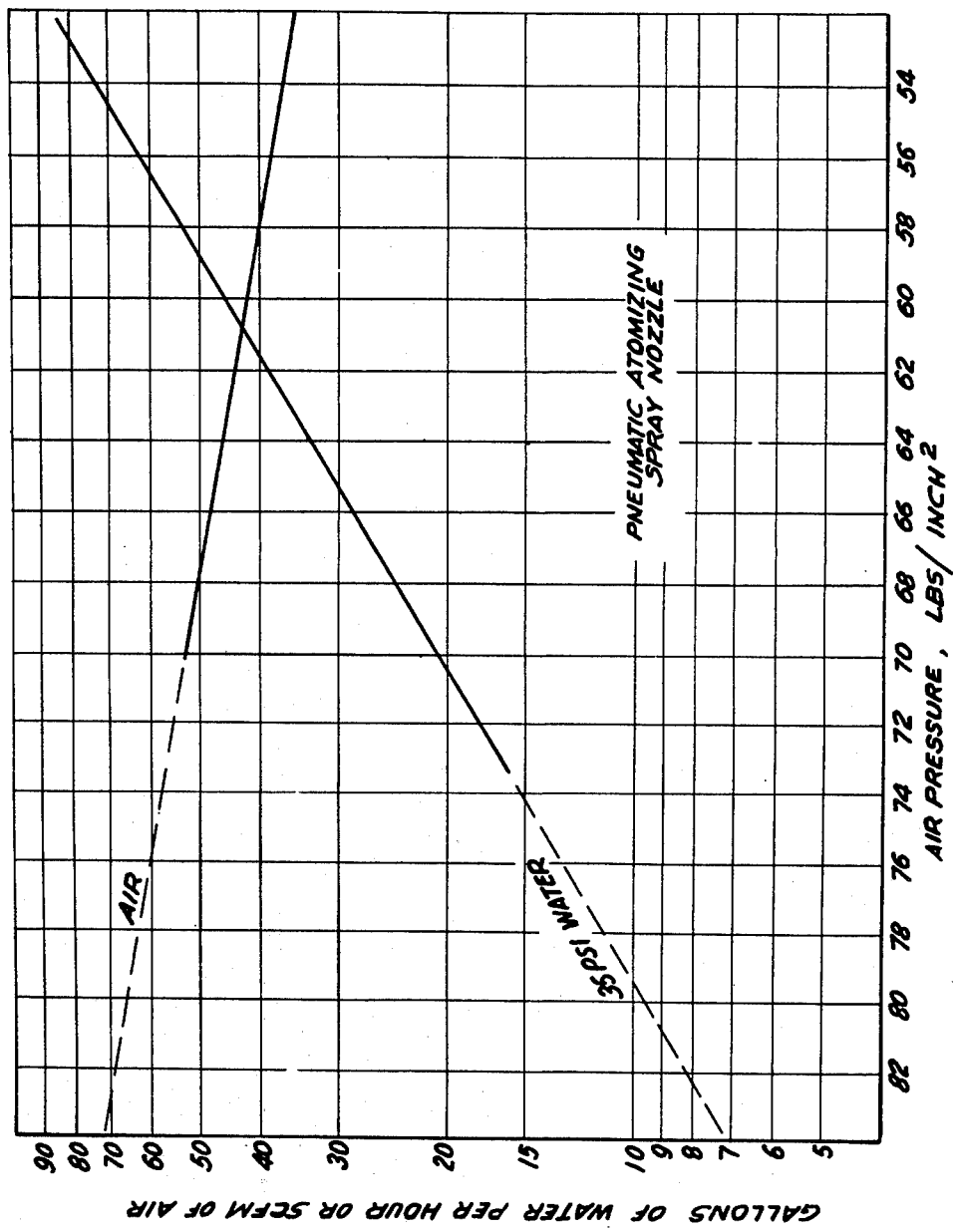
FIGS. 3 and 4 are graphs showing the variation of air and water through a spray nozzle as a function of air and water pressure.
Figure 4:
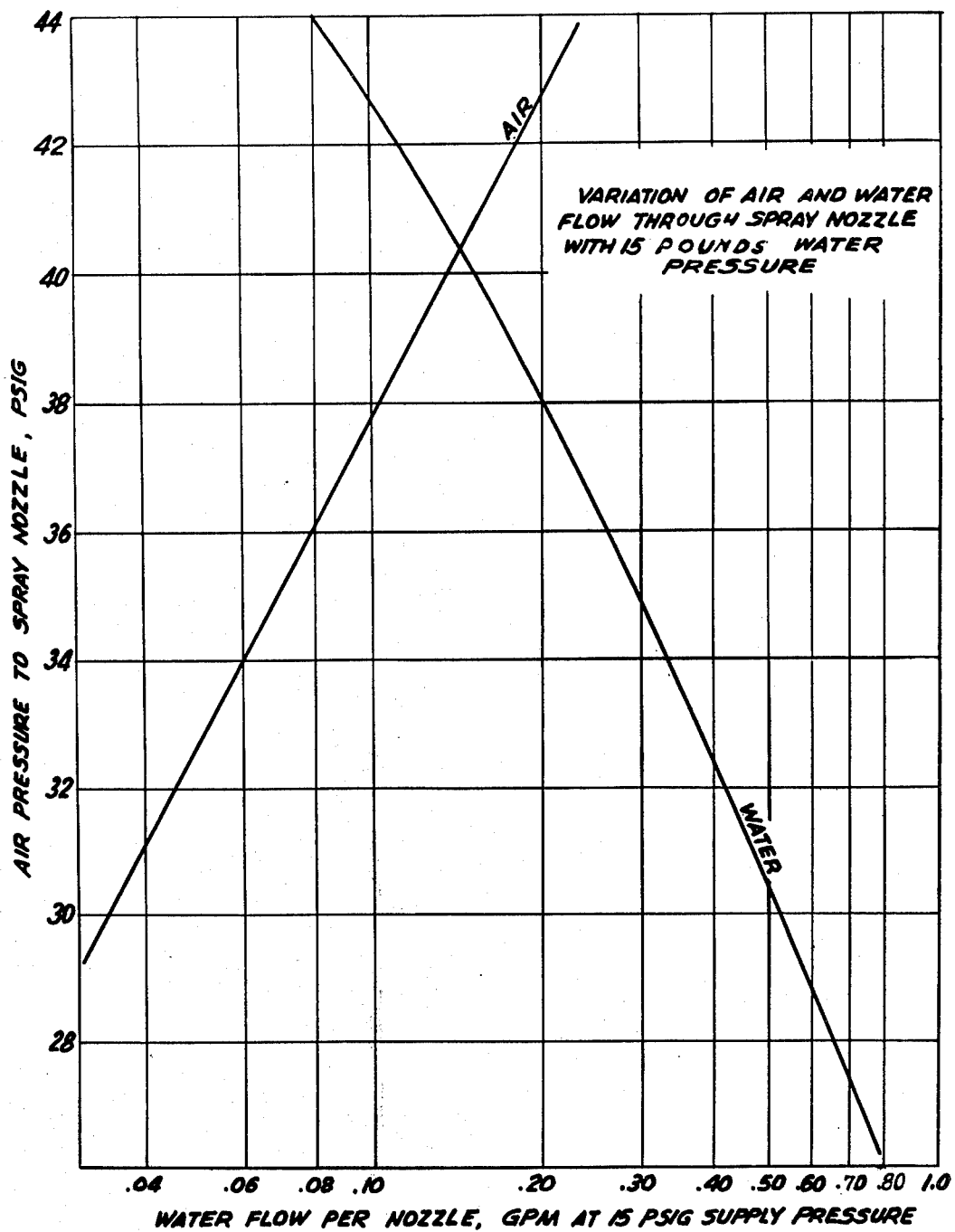

Broadly speaking, for any given water pressure, the water flow varies with the air pressure as shown in FIGS. 3 and 4; it will be noted that as the air pressure increases, the amount of water flow to the nozzle decreases. It is possible that at a given pressure of air, no water at all will flow out of the nozzle. Thus, the ratio of air to water can vary over a relatively broad range.

Figure 6:
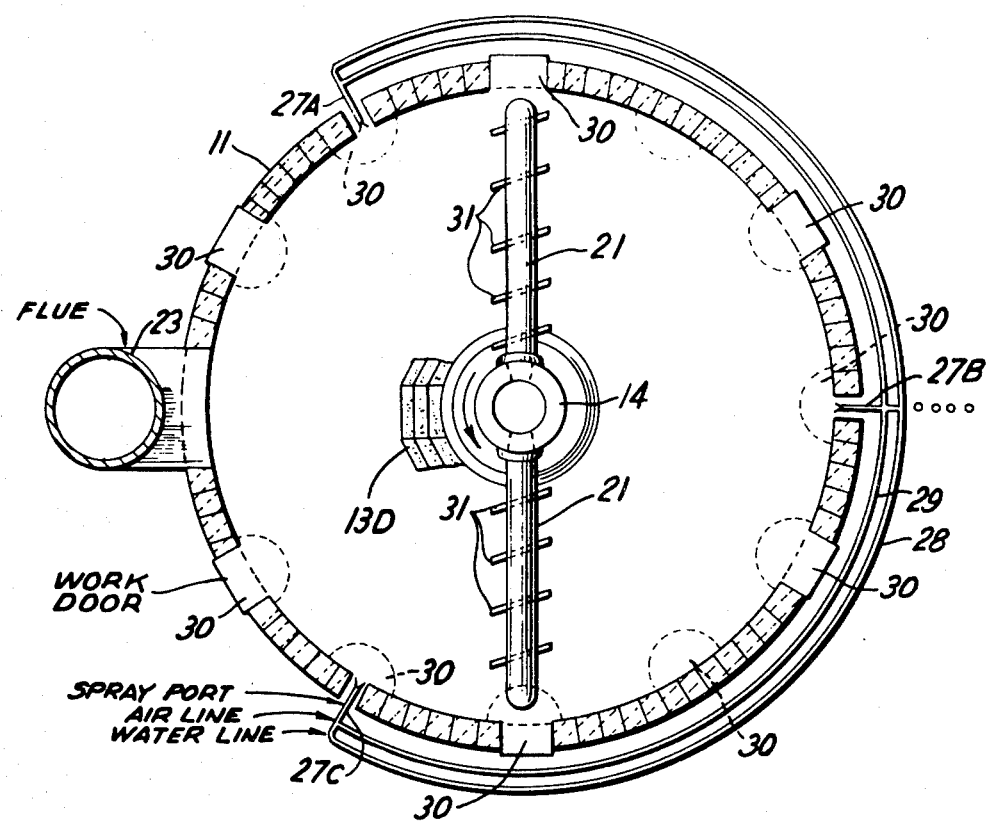
FIGS. 5 and 6 are vertical and plan views of a furnace fragment of the type shown in FIG. 1.
Figure 5:
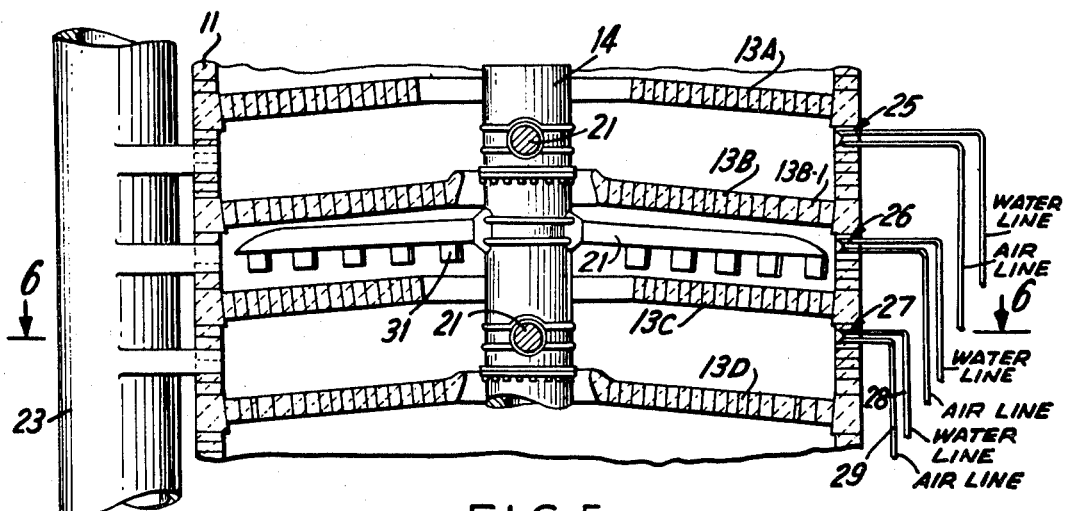

As illustrative of how the nozzles may be disposed about one or more hearths of the multi-hearth furnace, reference is made to FIGS. 5 and 6, FIG. 5 being a fragmented section in elevation of a multi-hearth roasting furnace of the type shown in FIG. 1, FIG. 6 being a plan view taken along line 6—6 of FIG. 5. Using the same numerals of FIG. 1, a fragment of the hollow shaft 14 is shown passing centrally through hearths 13A, 13B, 13C and 13D which extend radially inwardly from shell 11. For clarity, only one set of rabble arms 21 is shown. In the case of top hearth 13A, the rabble arms (not shown) move the material being roasted inwardly towards the hollow shaft where it drops off of hearth 13A onto hearth 13B, where it is rabbled outwardly (towards the furnace wall or shell) by rabble arms (not shown) where the material drops through openings 13B-1 onto the next succeeding hearth 13C, the material then being rabbled inwardly by arms 21, the material dropping off of hearth 13C onto hearth 13D below, and so on. In the case of sulfur-containing ore, the by-product sulfur dioxide, is exhausted through flue 23. If the sulfur dioxide is rich enough, it is circulated to a sulfuric acid recovery system where it is catalytically converted to sulfur trioxide preliminary to absorption in a sulfuric acid absorption tower.

In FIG. 5, nozzles 25, 26 and 27 are shown extending into wall openings at hearth levels 13B, 13C and 13D. Actually, three nozzles are disposed on each hearth level. However, depending on the size and configuration of a roasting zone or hearth, any number of nozzles may be employed. Referring to the top view of FIG. 6, which is taken through 13D, it will be noted that three nozzles (27A, 27B and 27C) are disposed and separated at substantially equal angles around the periphery of hearth 13D, the nozzles being coupled in parallel to water line 28 and air line 29.

As will be noted from FIG. 6, a plurality of work doors 30 is provided to allow accessibility for maintenance during roasting. The rakes 31 on rabble arms 21 are angles at 15° with the axis of the rabble arms and, by rotating in the direction of the arrow, cause the ore to move towards the outer wall of the furnace.

Figure 7:
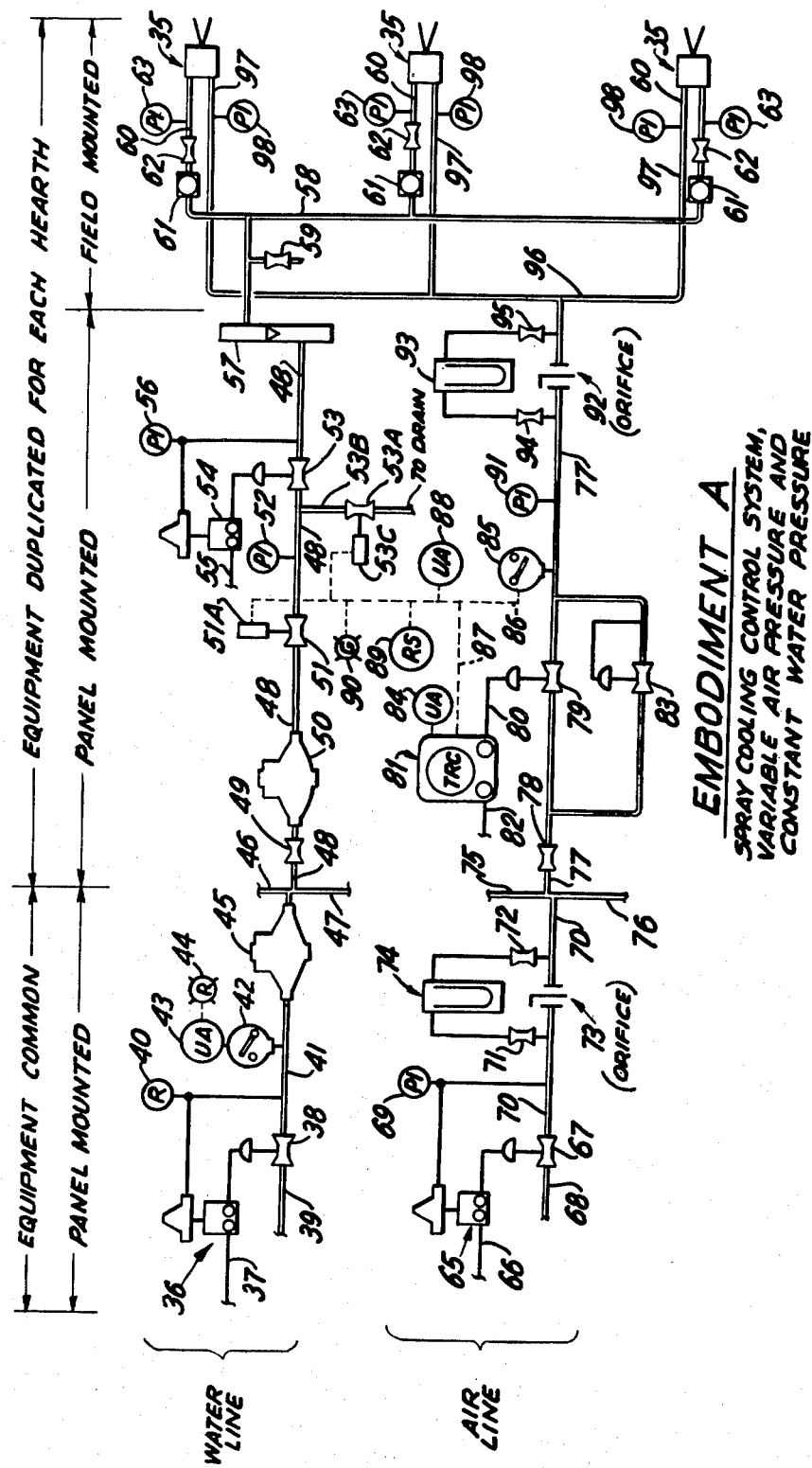
Figure 7A:
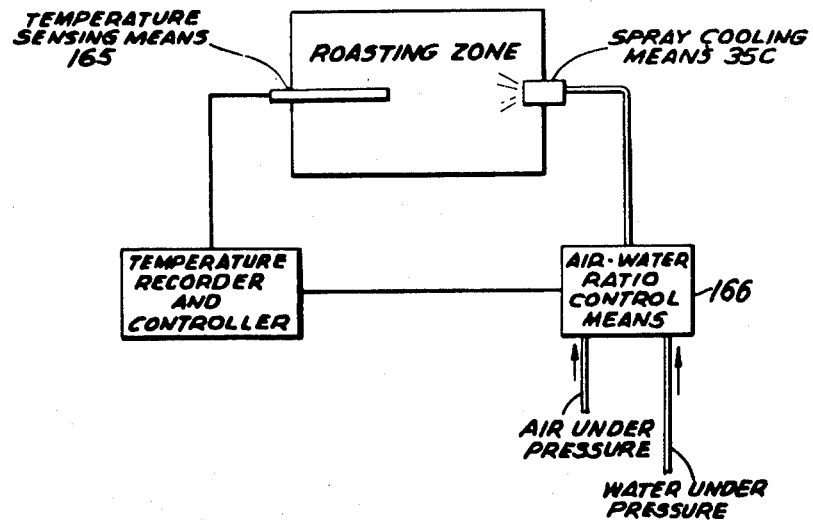

With regard to Embodiments A and B referred to hereinbefore, reference is made to the diagrammatic representations of FIGS. 7 and 8, respectively.

Embodiment A

In Embodiment A (varying air pressure), water and air are delivered under pressure to spray nozzles 35, three nozzles being shown in FIG. 7. Calibrated air and water flowing through each nozzle vary with air and water pressure. For any given water pressure, the water flow varies with the air pressure as shown in FIGS. 3 and 4. Referring to FIG. 7, it will be noted that the system employed is divided into two sections (1) the left hand section comprising the main air and water control lines which are panel mounted for the complete furnace, and (2) the right hand section which is illustrative of what is duplicated and repeated for each furnace hearth. As will be observed from FIG. 7, one part of the system is for feeding water under pressure, and the other part for feeding air under pressure.

Referring to the water line, constant water pressure pilot valve designated generally by the numeral 36 is provided coupled to an air supply via pipe 37 regulated at, for example, 22 psi on the one hand and coupled on the other hand to water control valve 38 (for constant water pressure), the process water being fed at 50 psi, by way of example, via line 39 to control valve 38. A pressure gauge 40 is provided coupled to constant main water pressure line 41 after valve 38 and also coupled to pilot valve 36 to indicate the pressure determined by the setting of valve 38 which is automatically controlled by pilot valve 36. A pressure switch 42 is coupled to water line 41 adapted to open with increasing pressure, the switch having coupled to it an annunciator alarm 43 having a signal lamp 44 electrically coupled to it.

A main water meter 45 is disposed after the annunciator alarm from which water is then fed to the various water lines of each hearth level, for example, hearth water lines shown partially at 46 and 47 (going to other hearths not shown) and hearth water line 48 of the hearth system shown on the right side of the flow sheet. The water passes through a valve 49, into water meter 50 and from there to a solenoid operated valve 51 which is normally closed but which is energized to open. Forward of valve 51 on line 48 is a water pressure gauge 52 which is followed by control valve 53 used to adjust constant water pressure supply for hydrostatic head. The valve is similarly controlled by a pilot valve 54 which is coupled to air supply via coupling 55 which may also be regulated at 22 psi, the pilot valve being also coupled to valve 53, a sensing pressure gauge 56 being coupled to both line 48 and pilot valve 54. The water in line 48 flows to a rotometer 57 and from there to water line 58 which feeds into spray nozzles 35. A water bleed-off valve 59 is coupled after meter 57. In each of the water branch lines 60 leading to the nozzles, sight flow indicators 61, manual throttling valves 62 and pressure gauges 63 are provided. Before valve 53, a normally open solenoid valve 53A is disposed in branch line 53B for releasing water to drain. The operation of this valve will be discussed later.

Referring now to the air line, a constant pressure pilot valve designated generally by the numeral 65 is provided coupled to an air supply via pipe 66 regulated at a pressure of, for example, 22 psi. The pilot valve is also coupled to control valve 67 (for constant air pressure) the process air being fed at, for example 50 psi via line 68 to control valve 67. An air pressure gauge 69 is provided coupled to constant main air pressure line 70 and also coupled to pilot valve 65 to indicate the pressure determined by the setting of air pressure valve 67 which is automatically controlled by pilot valve 65. An orifice 73 is provided in air line 70 across which is coupled a differential pressure gauge 74 via valves 71, 72, the differential pressure gauge being preferably calibrated to read cubic feet per minute of flow at normal temperature and pressure. The main air line is extended via branch lines 75, 76 to provide process air for other hearth spray systems, each hearth system having its own independent control. The piping to each hearth is a duplicate of the other as indicated by pipe line 77 through which the air is fed for distribution to nozzles 35 of one of the hearths.

The air to the hearth first passes through valve 78 and thence through control valve 79 for modulating air pressure, the control valve being controlled via line 80 by temperature recorder controller 81. Instrument air is fed to the recorder via line 82 at about 18 psi. Coupled in parallel to valve 79 is minimum pressure control valve 83 which is self-controlled to provide minimum pressure when conditions are such that valve 79 tends to completely cut off the air. An annunciator alarm 84 is coupled to the recorder to announce the onset of an abnormal condition.

Following valves 79 and 83 is an air line pressure switch 85 having a contact which opens at low air pressure. The switch is electrically coupled via lines (dotted) 86 and 87 to a micro-switch in recorder 81, line 86 also being coupled to another annunciator alarm 88 and to a rotation switch (RS) 89 which is mounted on the center column of the furnace, or the equivalent, and also to a signal lamp 90. The line 86 continues and is coupled to a solenoid 51A of water valve 51 in water line 48 and also coupled to solenoid 53C of water drain valve 53A.

Following pressure switch 85 is an air pressure gauge 91 which reads the pressure of the air prior to flowing through orifice 92 across which is coupled differential pressure gauge 93 via valves 94, 95. The air leaving orifice 92 flows into branch air line 96 which feeds each of the air lines 97 of spray nozzles 35 at an air pressure measured by gauges 98.

In utilizing the system of Embodiment A for one or more roasting hearths, water pressure is controlled to some prescribed value by pressure regulator 53. Compressed air is supplied to the system at some fixed pressure as determined by air pressure regulator 67. This also serves to limit the maximum air flow through the nozzles. Temperature controller 81 senses the temperature of the furnace hearth and provides an impulse for modulating air pressure to the nozzle by means of air pressure regulator 79 via line 80.

Temperature controller 81 is connected in such a manner that if the hearth temperature is above the control point, pressure regulator 79 is signalled to decrease air pressure to nozzle 35. This reduces air flow to the hearth and increases water flow in a manner illustrated by FIGS. 3 and 4. The decreased air flow tends to reduce the amount of heat evolved, while the increased water flow increases the amount of heat dissipated. Hearth temperatures are consequently reduced. If temperatures are below the control point, the reverse action occurs. In this manner, a balance is established between heat released and heat dissipated so that temperature remains constant at the control point.

The electric circuit employed for instrumenting the controls will be apparent from the flow sheet of FIG. 7 to those skilled in the art and need not be detailed in the drawings.

If air pressure is too low, the water spray becomes coarse and, in extreme cases, becomes a stream rather than a spray. This is prevented by air pressure regulator 83 and pressure switch 85. Pressure regulator 83 maintains a minimum air pressure to the sprays that is independent of the action of the temperature controller. Pressure switch 85 includes an electrical contact that opens whenever the air pressure in the line to the nozzles is below a prescribed minimum value. Solenoid values 51 and 53A are operated by the electrical contact in air pressure switch 85. If the electrical contact in pressure switch 85 is open, solenoid valve 51 closes and solenoid valve 53A opens. In this manner, flow of water through the nozzles is prevented unless air pressure to control the flow is available. If the electrical contact in pressure switch 85 is closed, solenoid valve 51 opens and solenoid valve 53A closes. Water then flows through the nozzles 35 in accord with variation in the air pressure to the nozzles.

Temperature controller 81 contains an electrical contact which opens if the measured temperature is below some prescribed value. This electrical contact is connected in series with the electrical contact in air pressure switch 85. If the electrical contact in temperature controller 81 is open, solenoid valve 51 closes and solenoid valve 53A opens. In this manner, flow of water through the nozzles is prevented if the measured temperature is below a prescribed minimum.

Additional safeguards may be incorporated in the same manner as the electrical contacts in air pressure switch 85 and temperature controller 81. In particular, it is desirable to include a contact operated by the roaster control circuit which will prevent flow of water through the nozzles at such time as the roaster may not be in operation.

With solenoid valve 51 requiring electrical energy to open the valve and solenoid valve 53A requiring electrical energy to close the valve, there can be no flow of water through the nozzles unless electrical power is available for the control circuit.

Pressure gauges 40, 52, 63, 69, 91 and 98, rotometer 57, water meters 45 and 50, orifices 73 and 92, and differential pressure gauges 74 and 93 are desirable but not essential to the operation of the system. With charts such as FIGS. 3 and 4, the foregoing pressure gauges may be used to estimate water and air flow through the nozzles. Rotometer 57 provides an instantaneous measure of the water flow which may be compared to the estimate of water flow derived from a reading of water pressure gauges 40, 52 and 63 to determine that the spray nozzles 35 have remained in calibration. Water meter 45 provides a measure of total water consumption.

For any given water pressure to the nozzles, there is an air pressure which will completely prevent flow of water through the nozzles. That is, as the air pressure increases toward some maximum, the water flow is shut off. The air pressure required for shut off increases with water pressure. The maximum must always be equal to or greater than the shut-off pressure. Otherwise, there can be no modulation to zero water flow and excess cooling could occur.

The capacity of the system may be changed by adjusting water pressure regulator 53 and air pressure regulators 67 and 83. An increase in the water pressure delivered by regulator 53 requires that the maximum air pressure controlled by regulator 67 and the minimum air pressure controlled by regulator 83 be increased.

For best results with a multi-hearth installation, spray nozzles 35 on each hearth will be controlled as a unit by control valves 79, 83 and 53, temperature controller 81 and water solenoid valves 51 and 53A provided for each controlled hearth.

Embodiment B

The flow sheet of Embodiment B is represented by FIG. 8. As in Embodiment A, the system is divided into two sections, (1) the left hand section comprising the main air and water control lines which are panel mounted for the complete furnace, and (2) the right hand section which is illustrative of what is duplicated and repeated for each furnace hearth. As will be similarly observed for FIG. 8, one part of the system is for feeding water under pressure, and the other part for feeding air under pressure. This system provides a spray cooling control system in which the air pressure is constant and the water pressure is variable and therefore adjustable to the amount required by the furnace to control the temperature.

Referring to the water line, constant water pressure pilot valve designated generally by the numeral 100 is provided coupled to an air supply via pipe 101 regulated at, for example, 22 psi and also coupled to water control valve 102 (for constant water pressure), the process water being fed at 50 psi, by way of example, via line 103 coupled to control valve 102. A pressure gauge 104 is provided coupled by line 105 across the main water line and pilot valve 100 to indicate the pressure set by valve 102. The water line following valve 102 has a water valve 106 with associated solenoid 106A electrically coupled (note dotted lines) to rotation switch 107 which is on the furnace center column, or the equivalent.

The water line continues as line 108 which is coupled to pressure switch 109 electrically coupled to annunciator alarm 110 and light signal 111. Water line 108 feeds into water meter 112 and from there to various lines of each hearth such as 113, 114 and 115 to the right of the flow sheet.

A gate valve 116 is series coupled to line 115 and to water meter 117, the water meter in turn being coupled to control valve 118 for modulating the water pressure. The valve 118 is controlled via a differential pressure pilot valve designated generally by the numerals 119 and 120, the pilot valve having an air supply coupled thereto via pipe 121 regulated at a suitable pressure, such as 22 psi. The pilot valve is in turn coupled to a temperature recorder controller 122 via line 123, the controller also being coupled to an air supply by means of a pipe 124. An annunciator alarm 125 is also electrically coupled to the controller. The controller in turn is electrically coupled via line 126 to other components to be described later.

The water line has another water pressure gauge 127 coupled across pilot valve 120 and water line 115 to indicate the pressure in the water line controlled through differential pressure pilot valve 119-120. A normally closed solenoid actuated valve 128 with associated solenoid 128A is disposed in water line 115 after pressure gauge 127, the solenoid being electrically coupled to temperature controller 122 via lines 128B and 126. A drain valve 129 is coupled to line 130 branching from water line 115, the valve having a solenoid 129A which is also controlled via line 126 from the temperature controller.

The water line 115 passes through water flow meter 131 and from there into water branch line 132 to which are coupled water feed lines 133 for feeding water under pressure to water spray assemblies 35A in one or more hearths. A water test bleed-off valve 131A is provided off the line from the flow meter. Each of water feed lines 133 has a manually operable water valve 134 for throttling or shutting off the water. A water pressure gauge 135 is also provided in each water feed line to a spray assembly.

Referring now to the air line, a constant pressure pilot valve designated generally by the numeral 140 is provided coupled to an air supply line via pipe 141 regulated at a pressure of, for example, 22 psi. The pilot valve is also coupled via line 143 to control valve 142 (for constant air pressure supply), the control valve being fed by process air at a pressure of, for example, 50 psi through line 144, the air flowing through valve 142 into main line 145. An air pressure gauge 146 is coupled across pilot valve 140 and main air line 145. The air in the main line passes through orifice 147 across which is coupled a differential pressure gauge 148 by means of air valves 149, 150, the differential pressure gauge being preferably calibrated to read cubic feet per minute of flow at normal temperature and pressure. The main air line is extended via branch lines 151, 152 to other hearth spray systems, not shown, each hearth system having its own independent control. The piping to each hearth is a duplicate of the other as indicated by pipe line 153 through which the air is fed for distribution to nozzles 35A of one of the hearths.

The air directed to the hearth system designated to the right of the flow sheet passes through an air valve 154 and from there to the spray cooling assemblies. Coupled to air line 153 is an air pressure switch 155 which is electrically coupled in series to the temperature recorder 122 via line 126, the line also having coupled in parallel therewith an annunciator alarm 156, a signal lamp 157, solenoid 128B and solenoid 129A. Air line 153 feeds air to the spray cooling assemblies via branch line 158 which, in turn, supplies each of lines 159 of the three spray cooling assemblies of nozzles 35A, each of the lines 159 having an air pressure gauge 160 for indicating the pressure at the spray nozzle.

In utilizing the system of Embodiment B for one or more roasting hearths, water is delivered to spray nozzles 35A at varying pressures as determined by control valve 118. Temperature controller 122 senses the temperature of the furnace hearth and provides a pneumatic impulse to differential pilot valve 119-120. As the hearth temperature rises above the desired control temperature, the temperature controller 122 increases the pneumatic pressure to differential valve pilot 119-120. This, in turn, increases the pneumatic pressure of the differential pilot valve to the diaphragm of the control valve 118. As the pneumatic pressure to the diaphragm of the control valve 118 increases, control valve 118 opens until the output pressure balances the pneumatic signal to the differential pilot valve. With increased pressure to spray nozzles 35A, water flow to the furnace increases to reduce temperature towards the desired control temperature.

As the hearth temperature falls below the desired temperature, the reverse action occurs. That is, the pneumatic pressure from temperature controller 122 decreases. The output hydraulic pressure of control valve 118 is now greater than the pneumatic pressure from temperature controller 122. This causes the differential pilot valve 119-120 to decrease its output pneumatic pressure to control valve 118 until the output pressure of control valve 118 is in balance with the lower pneumatic pressure from temperature controller 122. Water flow to the furnace is reduced and the furnace temperature rises toward the control temperature.

Modulation of water flow to the furnace hearth by the means described successfully controls hearth temperatures. Solenoid valve 128 provides a means for interrupting the flow of water through spray nozzles 35A, in response to control safeguards. Solenoid valve 129 relieves the downstream pressure on solenoid valve 128 to provide added assurance that solenoid valve 128 will move to tight closure. Solenoid valve 129 also provides a connection to drain any leakage through solenoid valve 128 should the solenoid valve not move to tight closure.

It is essential that the system be operated at not less than stated air pressure. If the air pressure is too low, the water spray becomes coarse and, in extreme cases, forms a stream rather than a spray. This is prevented by pressure switch 155 on the air supply line. Pressure switch 155 includes an electrical contact that opens whenever the air pressure in the line to spray nozzles 35A is below a prescribed minimum value. If the electrical contact in pressure switch 155 opens, solenoid valve 128 closes and solenoid valve 129 opens. In this manner, flow of water through nozzles 35A is prevented unless sufficient air pressure is available.

Temperature controller 122 contains an electrical contact which opens if the measured temperature is below some prescribed value. If the electrical contact in temperature controller 122 opens, solenoid valve 128 closes and solenoid valve 129 opens. In this manner, flow of water through the nozzles 35A is prevented if the hearth temperature is below the prescribed value.

Additional safeguards may be incorporated in the same manner as the electrical contacts in pressure switch 155, r 122, or rotation switch 107.

Water pressure indicator 104, 127 and 135, air pressure indicator 146 and 160, sight flow indicators, water rotometers 131, water meters 112 and 117, water pressure switch 109, orifice 147, and air flow meter 148, are desirable but not essential to the operation of this system. Control valve 102 modulates the supply water pressure to a constant value and prevents change of water pressure to spray nozzles 35A except by action of temperature controllers 122. For best results with a multi-hearth installation, spray nozzles 35A on each hearth will be controlled as a unit by a control valve 118, temperature controller 122 and solenoid valve 128 provided for each control hearth.

Figure 9:
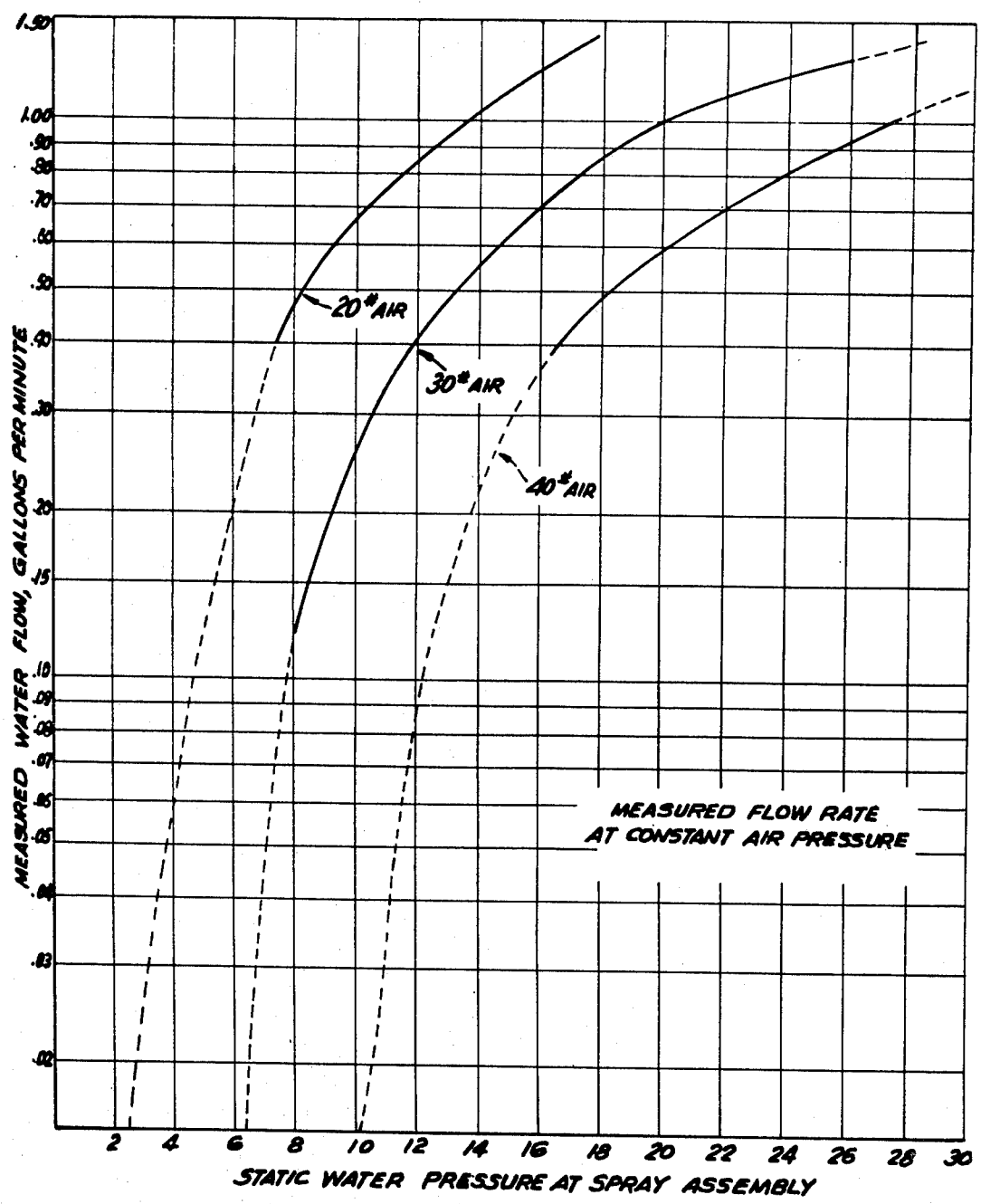
FIG. 9 is a graph showing the rate of water flow through a nozzle as a function of water and air pressure.

As illustrative of the condition obtainable with Embodiment B at constant air pressures of 20, 30 and 40 psi, reference is made to FIG. 9 which relates water flow against static water pressure at the spray assemblies at the foregoing stated constant air pressures.

EXAMPLES OF THE INVENTION

Figure 10:
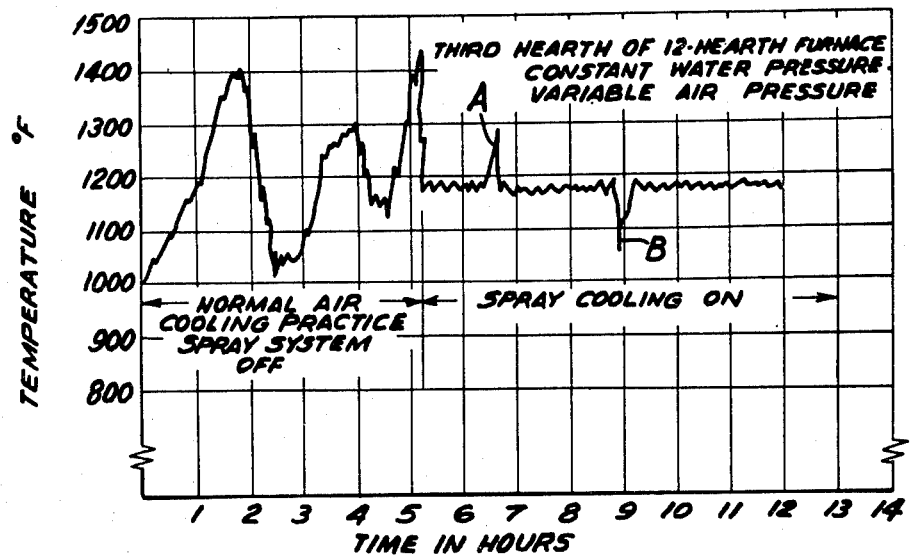
FIGS. 10 to 12 are representative of temperature charts illustrating the temperature control obtainable in a roasting hearth with the spray cooling concept of the invention.

In carrying the invention into practice, a series of test runs were made on a twelve hearth roasting furnace in which data were collected comparing spray cooling with conventional molybdenite roasting practice. Starting with the third hearth from the top (note FIG. 1), as the control hearth, a continuous record was made without using the control system in which it was noted that the temperature varied irregularly and sometimes precipitously from less than 900° F. to more than 1480° F., a temperature difference of up to 600° F. or more. However, when the spray cooling concept of Embodiment A of the invention (constant water pressure) was employed, a steady state temperature level in the neighborhood of about 1150° F. to 1200° F. was obtained and maintained for a period of almost 8 hours. In this connection, reference is made to FIG. 10 which is a temperature-time plot on rectangular coordinates, the data having been taken off a radial or circular temperature control chart. The two "blips" A and B shown on the chart during the spray cooling cycle are due to interruptions, such as opening and closing of the doors on the hearths and/or manual setting of the temperature recorder. In any event, a very smooth temperature control was maintained for upwards of at least 8 hours of steady operation.

Spray cooling assemblies were placed in each of the east and west side ports of the third hearth, all air inlets to the third hearth being closed. When the spray system was turned on, the hearth temperature fell quickly from about 1450° F. to about 1180° F. and held substantially at that level at a variation of about ±20° F. until the system was turned off. The control index of the temperature controller was set at 1150° F. and any variation in temperature was immediately detected and the ratio of water and air fed to the hearth was automatically varied to meet the needs of the hearth. The details of how the control was effected have been described for Embodiments A and B and need not be discussed here. However, the relationship between the water and air feed under pressure to the spray assemblies is given as follows in Tables I and IA:

TABLE I

Water Pressure Maintained at 15-18 psi

| Time Hours-Min. | Gal. of Water | Time (Min.) | Average Flow Gal/Min. |
|---|---|---|---|
| 5:15 | — | — | — |
| 5:52 | 27 | 37 | 0.730 |
| 7:17 | 40 | 85 | 0.471 |
| 8:15 | 2 | 58 | 0.034 |
| 9:20 | 27 | 65 | 0.415 |
| 9:45 | 16 | 25 | 0.640 |
| 10:40 | 20 | 55 | 0.364 |
| 11:55 | 19 | 75 | 0.253 |
| | 151 | 400 | 0.378 Av. |

TABLE 1A

Air Pressure to Nozzles

| Time Hours-Min. | Time in Minutes | No. of Air Pressure Readings | Controlled Air Pressure Max. | Min. | Av. |
|---|---|---|---|---|---|
| 5:15–6:23 | 68 | 15 | 54 | 36 | 44.3 |
| 6:23–7:17 | 54 | 16 | 57 | 36 | 48.1 |
| 7:23–8:15 | 58 | 11 | 64 | 54 | 57.8 |
| 8:15–9:20 | 65 | 6 | 68 | 38 | 48.3 |
| 9:20–10:40 | 80 | 12 | 50 | 42 | 45.8 |
| 9:40–10:55 | 75 | 8 | 48 | 44 | 45.5 |

In a similar test run on the third hearth of the 12-hearth multi-hearth roaster, observations were made regarding the controlled air pressure required to completely shut water flow through the spray nozzles. The values obtained are as follows:

| Water Pressure, psi. | Controlled Air Pressure for Water Shut-Off, psi. |
|---|---|
| 15 | 58 |
| 21 | 72 |

As will be noted, an air pressure of 58 psi will prevent water at 15 psi from flowing through the spray nozzles, while an air pressure of 72 psi will shut off water at a pressure of 21 psi. Where such conditions occur in the control system, the temperature will rise in the roasting zone until the correct air pressure is used with the constant water pressure.

A test run was made on molybdenite concentrate on the second hearth of the same furnace in accordance with Embodiment A and a remarkably easy temperature control was obtained. So long as the air supply pressure to the control station was maintained constant, the pressure at the control station could be adjusted easily and controlled by the temperature controller. With static water pressure controlled to between 10 and 12 psi, water flow to the second hearth was recorded as follows:

TABLE II

| Time Hours:Min. | Gallons of Water | Time in Minutes | Average Flow Gal/Min | Lbs/Min |
|---|---|---|---|---|
| 9:15 | — | — | — | — |
| 10:00 | 9.0 | 45 | 0.200 | 1.67 |
| 11:00 | 15.0 | 60 | 0.250 | 2.08 |
| 12:00 | 12.7 | 60 | 0.212 | 1.77 |
| 12:30 | 7.8 | 30 | 0.260 | 2.17 |
| 1:30 | 16.2 | 60 | 0.270 | 2.25 |
| 2:45 | 23.2 | 75 | 0.309 | 2.58 |
| 3:45 | 13.9 | 60 | 0.239 | 1.93 |
| | 97.8 | 390 | 0.251 | 2.09 |

TABLE IIA

| Time | No. Pressure Readings | Controlled Air Pressure At Control Station | | |
|---|---|---|---|---|
| | | Max. | Min. | Av. |
| 9:15–11:30 | 10 | 38 | 34 | 36 |
| 11:30–1:45 | 9 | 40 | 36 | 37 |
| 1:45–3:45 | 8 | 42 | 36 | 38 |

Figure 11:
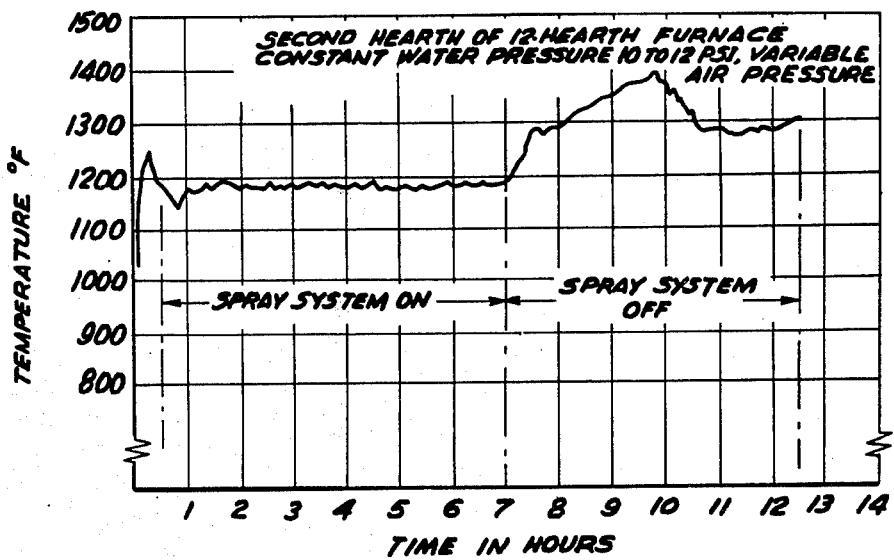

The excellent degree of control obtained is illustrated in FIG. 11 which shows the difference in control obtained with the spray system as compared to conventional practice with the spray system off. The data were obtained from a radial or circular temperature control chart and transformed to rectangular coordinates. Additional tests conducted on the same hearth showed that continuous gas samples drawn from the second and fourth hearths analyzed about 3 to 4% $SO_2$.

As illustrative of the desulfurization that occurs during roasting at various hearth levels after achieving a steady state and starting at hearth No. 3 near the top and ending with hearth No. 12 at the bottom, the following analyses are given:

TABLE III

| Hearth No. | % Sulfur |
|---|---|
| 3 | 27.25 |
| 4 | 21.0 |
| 5 | 15.2 |
| 6 | 5.9 |
| 7 | 1.5 |
| 8 | 0.5 |
| 9 | 0.038 |
| 10 | 0.036 |
| 11 | 0.012 |
| 12 | 0.011 |

Observations of the method of the invention indicated: (1) that the maximum water pressure should be low enough so that the available air pressure is sufficient to modulate the water flow to zero; and (2) that the minimum air pressure should be sufficiently high to insure satisfactory atomization of the water.

Figure 12:
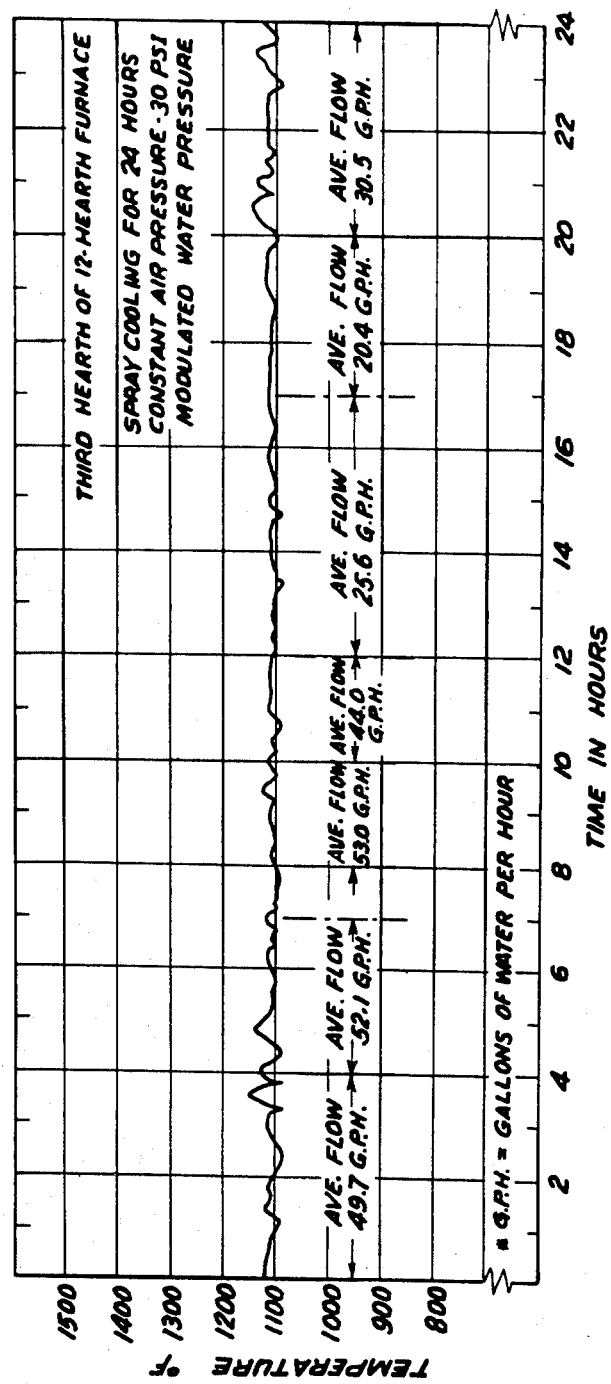

Two 5-day continuous tests were carried out in which the third hearth of the 12-hearth roaster was controlled. The tests demonstrated the practical feasibility of using constant air pressure and modulated water pressure, that is, Embodiment B, as the method of controlling the roasting temperature at hearth No. 3. Water flow during the test period was found to be sufficiently variable, thus suggesting that there were significant changes in heat evolved in the third hearth. As illustrative of using modulated water pressure and, thus, variable water flow to control the temperature on hearth No. 3, reference is made to FIG. 12 which shows a continuous 24-hour run typical of the 5-day campaign, the data having been obtained from a radial or circular temperature chart and then transposed onto rectangular coordinates. The air pressure to the nozzles was maintained substantially constant at about 30 lbs/in² (psi). It will be noted that the water flow was varied from as low as 20.4 gallons per hour (G.P.H.) to as high as 53.0 G.P.H. in order to maintain the average temperature in the third hearth at slightly above about 1100° F.

Additional tests have indicated that two or more hearths can be controlled simultaneously using the system of the invention. With regard to one test in particular using Embodiment B, three hearths were controlled for a period of three days. Thus, as shown in FIG. 7, branch lines 46 and 47 (water lines), and branch lines 75 and 76 (air lines) are adapted for coupling to some or all of the hearths using a duplicate of the system (either two or three spray units) shown to the right of the flow sheet. The same is true for the flow sheet of FIG. 8.

While the invention has been described with respect to the two Embodiments A and B, it will be appreciated that the invention can be practiced in many forms. For instance, the temperature controller might be used in some cases to modulate water flow by direct action on control valve 118 (FIG. 8) without the use of a differential pilot. This sytem, however, would require more delicate adjustment and would not have safeguards for water-air ratios provided by Embodiments A or B.

In its broad aspects, the roasting temperature of the burden in the furnace may be controlled by providing the air and water at a designated ratio using a ratio control means and then selectively varying the ratio of the two components fed to the nozzle whenever the temperature of the furnace varies from the desired average temperature. Thus, in the block diagram of FIG. 7A, an air-water ratio control means of any conventional design is provided into which air and water are separately fed under pressure. The two component fluid system is then fed to nozzle 35C and from there to the roasting zone. Temperature sensing means 165 detects any variation from the norm which results in a signal or pulse being sent by the temperature recorder controller to the air-water ratio control means 166.

Figures 7B, 8A:
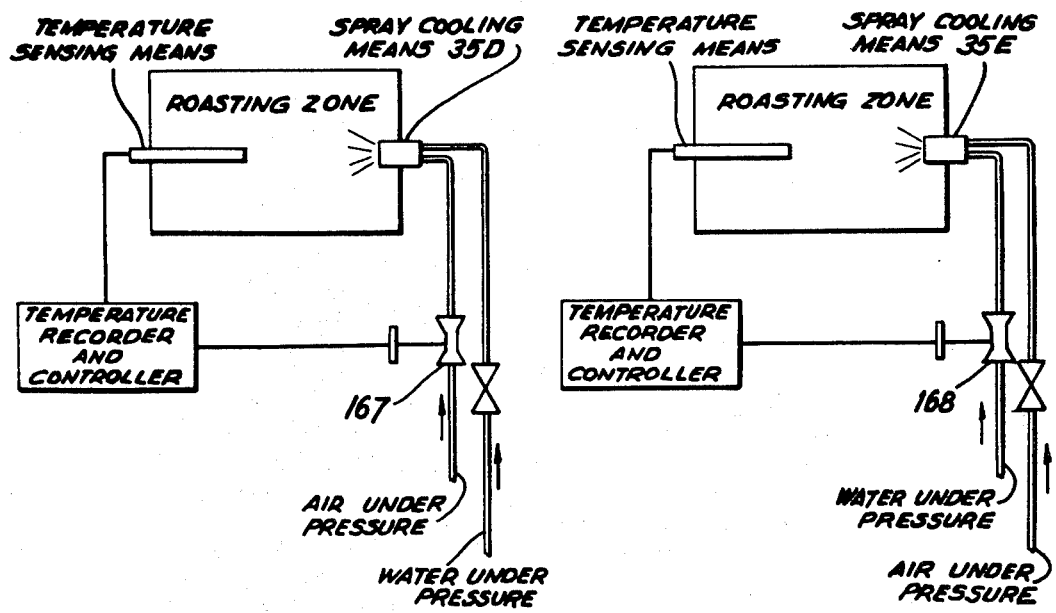

In the block diagram of FIG. 7B (Embodiment A), the temperature controller separately actuates air valve 167 so as to provide the desired ratio of the two fluid components, (the water pressure is maintained substantially constant) at spray nozzle or means 35D. In the block diagram of FIG. 8A (Embodiment B), it is the water valve 168 which is actuated by the temperature controller in providing the correct air-water ratio at spray nozzle or means 35E.

Observation of the roasting operation has indicated that the roasting efficiency can be further improved by proper design of the rabble arms. For example, it has been observed that the color of the burden in the hearth changes as the burden is rabbled. It is characteristic that the color brightens shortly after a rabble arm passes through the burden and then gradually loses color prior to arrival of the following rabble arm. This suggests that the reaction rate changes constantly in a cyclic manner, and that the average rate would be increased by more frequent rabblings. Thus, by using four rabbling arms connected at right angles to each other instead of two, the amount of rabbling can be doubled by having three arms rabble the burden forward and one arm rabble it backward. Examples of improved rabbling systems are shown diagrammatically in FIG. 13 as arrangements X and Y. The arms I, II, III and IV are shown arranged in parallel for comparison, whereas actually they would be radially disposed at right angles to each other and rotate in a circular path.

In arrangement X, rabble arms I, II and IV have blades or raking tines 170 which are angularly oriented in the same direction (e.g. 15°), while blades 171 of rabble arm III are oriented in the opposite direction. Assuming the arms to be moving up, the burden or ore is caused to be moved to the left via arms I and II and then to the right via arm III. The last rabble arm IV then moves the burden to the left again. Thus, there are three movements of the burden to the left and one to the right for each circular rotation of the rabble arms such that the net result is a gradual movement of the burden to the left of the hearth. By having four rabble arms, the amount of rabbling is doubled without changing the retention time on the hearth, thereby having an increasing effect on the rate of the oxidation. Alternate hearths in which the burden is moved to the left would use arrangement X.

In the alternate hearths where the burden is moved to the right, arrangement Y would be used. As will be noted in FIG. 13, the blades or tines 172 of rabble arm I, II and IV are angularly oriented (e.g. 15°) to the left, while blades or tines 173 are angularly oriented in the opposite direction to the right. Thus, as the rabble arms move upward, arms I and II move the burden to the right, while arm III moves it to the left. The last rabble arm IV then moves the burden or concentrate again to the right so that the net effect is a movement of the burden to the right in alternate hearth levels.

It will be apparent from the foregoing description that many modifications and variations may be resorted to without departing from the spirit and scope of the invention. In its broad aspects, the invention provides a method for controlling the temperature in the roasting of metalliferous materials, such as metal sulfide concentrates, which comprises establishing a bed of the material in a roasting zone, and continually feeding a spray mixture of water and air to the zone. Examples of metal sulfide concentrates are those comprising iron sulfide, copper sulfide, zinc sulfide, nickel sulfide, mixtures of nickel and copper sulfide, molybdenum sulfide, and the like. The invention is particularly applicable to the roasting of molybdenum sulfide concentrates, e.g. molybdenite, containing about 48% to 60% molybdenum and 32% to 40% sulfur and substantially the balance residual gangue materials and incidental impurities.

A preferred aspect of the invention resides in controlling the roasting temperature by selectively varying the ratio of water and air sprayed into the roasting zone. This is achieved by continually sensing the temperature in the roasting zone and then continually varying the ratio of the water and air fed into the furnace in accordance with the temperature change sensed in the roasting zone. The two fluid components, water and air, are fed under pressure to strategically placed spray nozzles in one or more roasting hearths, each of the components being pressure regulated by means of pressure-regulating valves. A temperature-responsive control means is employed to actuate one or the other of said valves in order to vary the ratio of the fluids fed to the spray nozzles. Thus, in one embodiment, the air pressure may be varied, while the water pressure is maintained substantially constant. In an alternative embodiment, the air pressure may be maintained substantially constant while the water pressure is varied. Whichever method is used, the ratio can be varied according to the requirements of the furnace.

In carrying out the invention in a multi-hearth furnace of the type illustrated in FIG. 1, one or all of the hearths may be controlled using the concept. Generally, at least some of the hearths, e.g. hearths No. 2 to No. 7 or 8 referenced from the top of a multi-hearth furnace, may require the control to insure optimum results of the invention. The system can easily be duplicated for each of the hearths according to the flow sheets of FIGS. 7 and 8.

As will be appreciated, the invention can be utilized as a method for producing flue gas enriched in sulfur dioxide. This has its advantages in the production of sulfuric acid. In producing the enriched flue gas, the method employed comprises establishing a heated roasting zone containing sulfur-containing material, such as a metal sulfide concentrate, feeding a spray mixture of water and air to the roasting zone, removing the flue gas formed during roasting enriched in sulfur dioxide, and then recovering the sulfur-containing component thereof. The enriched flue gas may contain from about 3% up to about 60% or more of sulfur dioxide. In recovering the sulfur component, the sulfur dioxide containing flue gas may be oxidized to sulfur trioxide by contact with an oxidation catalyst and the sulfur trioxide thereafter recovered in a sulfuric acid absorption tower in accordance with conventional practice.

As has been stated herein, the spray cooling concept of the invention offers many advantages among which are the following: (1) greater freedom for new plant location, or expanded capacity of existing locations made possible by minimized pollution; (2) reduced cost for air pollution control; (3) reduction in costs of roaster construction; (4) improved roaster temperature control; (5) greater expectations on financial return in the production of by-product sulfuric acid; (6) capacity increase on presently available units now limited by gas handling capacity; (7) improved roasting recovery; and (8) improved quality control, among other improvements.

The cost of recovering sulfur dioxide from flue gas decreases with increasing concentration of the sulfur dioxide. In existing conventionally operated molybdenum sulfide roasters, the flue gas is generally very lean in sulfur dioxide because of the use of excess air to control the temperature. By substituting water for some of the air which has approximately 6.4 times the heat capacity of air, the volume of flue gas is significantly reduced. With the reduction in flue gas volume, the concentration of sulfur dioxide is materially increased.

Reduction of the flue gas volume may also result in improved roaster recovery for two reasons. First, the dust load from the furnace will decrease as the gas volume across the hearth is decreased accompanied by a proportional decrease in metal loss; and, secondly, precipitator collection improves with a reduction in gas volume. Provision of flue gas handling equipment and dust collection systems constitute a major item in the cost of conversion facilities. Reduction of flue gas volume by spray cooling permits reduction in the size of future units with consequent cost reduction. Additionally, any conversion capacity increase effected by spray cooling decreases the magnitude of future roaster construction with consequent capital saving.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. In a method of controlling the oxidation roasting temperature of molybdenum disulfide to $MoO_3$ in a vertically disposed multi-hearth roasting furnace in which molybdenum disulfide is continually fed through a plurality of heated roasting hearths starting from the top hearth of the furnace and passing from one hearth to another through the bottom hearth thereof, during which roasting proceeds exothermically with the evolution of $SO_2$, such that selected upper level hearths exhibit a higher roasting temperature than lower level heaths and such that at least one of said upper hearths requires controlling to a desired roasting temperature, the improvement which comprises, establishing a flow of said molybdenum disulfide through said multi-hearth furnace while subjecting said molybdenum disulfide to roasting, feeding water under pressure to a first pressure-regulating water valve adapted to provide water at substantially constant pressure downstream thereof, causing said water at said constant pressure to pass through a second water valve located downstream thereof and then through at least one nozzle directed into said at least one of said selected upper roasting hearth of said multi-hearth roasting furnace for spraying a mixture of water droplets and air therein, said second water valve adjusting the water fed to said at least one nozzle to a predetermined pressure, feeding air under pressure to a first pressure-regulating air valve adapted to provide air at substantially constant pressure downstream thereof, causing said air to pass through a second air valve located downstream thereof and then through said same at least one nozzle, said second air valve adjusting the air fed to said at least one nozzle to a predetermined pressure, such that both said water and said air are fed under controlled predetermined pressures to said nozzle to produce an air-water droplet spray mixture in said at least one upper roasting hearth continually and automatically sensing the temperature in said at least one roasting hearth, and selectively varying the ratio of the water and air fed together to said nozzle by varying the pressure of one relative to the other by automatically adjusting either said second water valve or said second air valve in response to a difference in temperature between the temperature sensed and the desired roasting temperature of said molybdenum disulfide in said at least one upper hearth at substantially said desired temperature.

2. The method of claim 1, wherein the roasting temperature is controlled by varying the air pressure at said second air valve by means of a temperature control device continually sensing said roasting temperature, while maintaining the water pressure at said second water valve substantially constant.

3. The method of claim 1, wherein the roasting temperature is controlled by varying the water pressure at said second water valve by means of a temperature control device continually sensing said roasting temperature, while maintaining the air pressure at said second air valve substantially constant.

4. In a method of controlling the oxidation roasting of molybdenum disulfide to $MoO_3$ in a vertically disposed multi-hearth roasting furnace into which the molybdenum disulfide is fed continually from the top hearth of the furnace and passed from one hearth to another through the bottom hearth thereof, during which the roasting occurs exothermically with the evolution of $SO_2$ such that selected upper level hearths exhibit a higher roasting temperature than lower level hearths and such that at least one of said upper hearths requires controlling to a desired roasting temperature, the improvement which comprises, establishing a flow of said molybdenum disulfide through said multi-hearth furnace while subjecting said molybdenum disulfide to roasting, feeding air at a given pressure as a first fluid component to at least one nozzle directed into said at least one upper hearth for spraying a mixture of water droplets and air therein, feeding water at a given pressure as a second fluid component together with said air to the same at last one nozzle thereby forming a spray mixture, continually and automatically sensing the temperature in said at least one hearth, and selectively varying the ratio of the fluid components fed together to said nozzle by varying the pressure of one of said fluid components fed to said same nozzle relative to the other in response to the difference in temperature between the temperature sensed and the desired roasting temperature, whereby to control the roasting temperature of said molybdenum disulfide in said at least one upper hearth at substantially said desired temperature.

5. The method of claim 4, wherein the roasting temperature is controlled by varying the air pressure at said nozzle by means of a temperature control device continually sensing said roasting temperature, while maintaining the water pressure at said nozzle substantially constant.

6. The method of claim 4, wherein the roasting temperature is controlled by varying the water pressure at said nozzle by means of a temperature control device continually sensing said roasting temperture, while maintaining the air pressure at said nozzle substantially constant.

7. In a method for roasting molybdenum disulfide in a vertically disposed multi-hearth roasting furnace in which the concentrate is continually fed through a plurality of roasting hearths starting from the top hearth of the furnace and passing from one hearth to the next through to the bottom hearth thereof, such that at least one of said upper hearths requires controlling to a desired temperature, the improvement which comprises:

continually and automatically sensing the temperature on said at least one hearth; and in response to said sensing maintaining the temperature on said at least one hearth between about 1100° F. and about 1200° F. by spraying a mixture of water droplets and air thereon.

8. The method of claim 7, wherein said temperature is maintained by selectively varying the ratio of water and air in said spray.

* * * * *